United States Patent Office 3,479,377
Patented Nov. 18, 1969

3,479,377
HYDROXY PHENYL FATTY AMIDES AND POLYMERS THEREOF, THEIR PREPARATION AND USE
Victor L. Larimer, Morristown, Tenn., assignor, by mesne assignments, to Ashland Oil and Refining Company, a corporation of Kentucky
No Drawing. Continuation-in-part of application Ser. No. 445,741, Apr. 5, 1965. This application Dec. 20, 1965, Ser. No. 515,209
Int. Cl. C07c 103/12
U.S. Cl. 260—404                                   1 Claim

ABSTRACT OF THE DISCLOSURE

A novel class of hydroxy phenyl substituted fatty amides are provided particularly adapted for condensing with an aldehyde to prepare resinous compositions having utility in adhesive and surface coating applications.

---

This application is a continuation-in-part of Ser. No. 445,741 filed Apr. 5, 1965.

The present invention relates to the preparation and use of hydroxy phenyl fatty amides. In another aspect, the present invention relates to hydroxy phenyl stearamide and its subsequent reaction with formaldehyde to form polymeric materials useful as adhesives and as coatings.

The condensation of a phenolic compound (e.g. phenol, per se) with ethylenically unsaturated fatty acids is known in the art. See, for example, U.S. 3,074,983. Unfortunately, these compounds (i.e., the hydroxy phenylated fatty acids) have not found wide commercial use. Consequently, that segment of industry which is equipped to produce these compounds is highly interested in developing further uses for these compounds so that additional markets for them can be created.

I have now discovered, and this discovery forms one basis for the present invention, that hydroxy phenylated fatty acids can be converted to the corresponding amides (e.g., as by ammonolysis of the corresponding acid). These unique monomers (e.g., 9(10) (hydroxy phenyl) stearamide) can then be reacted with varying amounts of formaldehyde to form novel polymers. These polymers can be made of varying molecular weights ranging from liquid polymers or prepolymers to hard, solid resins by controlling or limiting the reaction, e.g., as by controlling the amount of formaldehyde used in the condensation. Some of these polymers (e.g., the liquid polymers) can be used as adhesives for metals, glass, or the like. Alternatively, the liquid prepolymers can be used in combination with other plastic and resin systems. Other of these polymers (e.g., the solid resins) can be used as molding and potting resins. Further, the original monomer (i.e., the original hydroxy phenyl fatty amide) can be used to modify the properties of alkyd resins, phenolic resins, and urethane derivatives.

In preparing the monomers of this invention, I generally proceed in the following manner: I start with a fatty acid containing ethylenic unsaturation (eg., oleic acid), and first condense it with a phenolic compound (e.g., 2,6-ditertiary butyl phenol). Subsequently, this hydroxy phenyl fatty acid is reacted with ammonia to form the corresponding amide. These hydroxy phenyl fatty amides typically have the following structure:

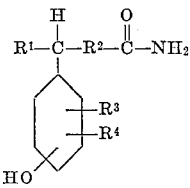

wherein $R^1$ is generally a monovalent aliphatic hydrocarbon radical (e.g., an alkyl radical); wherein $R^2$ is generally a divalent aliphatic hydrocarbon radical (e.g., an alkylene radical); and wherein $R^3$ and $R^4$ are each independently selected from the group consisting of hydrogen, hydroxyl, alkyl and alkylol. $R^1$ and $R^2$ are segments of the carbon backbone of the original (i.e., unreacted) fatty acid. The location of the hydroxyl group (relative to the point of attachment of the phenyl group to the fatty acid backbone) is not precisely known. Its position has been shown to vary, although the 4 and 6 positions seem favored in the case of phenol, per se. However, it has been clearly established that the phenolic hydroxyl group is not destroyed during the condensation reaction.

The unsaturated fatty acids that are useful in practicing the present invention include the mono- and polyethylenically unsaturated fatty acids containing from 8 to 26 carbon atoms in their monomeric form, such as those monomeric fatty acids derived from naturally occurring fats and oils. Preferred fatty acids are those containing from 10 to 24 carbon atoms. While various substituted acids could be used, it is preferred that the fatty acids contain only carbon and hydrogen in addition to the carboxyl group. Dimer acids prepared from these same unsaturated fatty acids can also be used (e.g., the dimer acid of oleic acid). Representative monomeric unsaturated fatty acids are oleic acid, linoleic acid, linolenic acid, polmitoleic acid, and erucic acid. Mixtures of unsaturated fatty acids can be, and frequently are, employed. Especially well suited for the practice of this invention are the monomeric unsaturated fatty acids (usually mixtures) obtained from soybean oil, linseed oil, and the like. These mixtures can contain minor amounts of saturated fatty acids. Oleic acid, as well as mixtures of fatty acids containing predominant amounts of oleic acid, are particularly preferred.

The phenolic compounds which can be condensed with these unsaturated fatty acids include phenol, per se (which is the most preferred material), as well as the various substituted phenols. As suggested by the structural formula previously given, it is preferred that no more than three of the benzenoid carbon atoms contain substituents other than hydrogen. The preferred substituents are the lower alkyl groups, i.e., those containing from 1 to 8, and preferably 1 to 4 carbon atoms per alkyl group; hydroxyl groups; and lower (e.g., $C_1$ to $C_4$) alkylol groups (e.g., methylol). Mixtures of phenolic compounds can be used. Suitable phenolic compounds include phenol; 2,4-dimethyl-1,3-dihydroxy benzene; p-cresol; pyrogallol; 2,6-ditertiary butyl phenol; resorcinol; and the like. I prefer that the ortho or para positions (and more preferably, both positions), relative to the phenolic hydroxyl group, be unsubstitued. This is because formaldehyde appears to preferentially react at those two sites.

It is to be noted that the condensation of the phenolic compound with the unsaturated fatty acid occurs at an ethylenic bond of the unsaturated fatty acid. It involves the addition of a benzenoid hydrogen atom to one side of the double bond and the addition of the aromatic residue to the other side of the unsaturated double bond. The condensation does not destroy the phenolic hydroxyl group. Since it is probable that the aromatic residue will go to either side of the double bond (although probably favoring one side) the crude condensation product will undoubtedly contain both types of product. For example, oleic acid contains an ethylenic double bond in the 9–10 position. When oleic acid and phenol are condensed, some 9(hydroxy phenyl) stearic acid and some 10(hydroxy phenyl) stearic acid are produced. As a convenience, the reaction product can be referred to as phenyl stearic acid or as 9(10)-hydroxy phenyl) stearic acid. Both forms of the condensation product are effective in the present invention and it is convenient to make no attempt to separate the two.

The corresponding amides can be formed by ammonolysis of the hydroxy phenyl fatty acid with ammonia. Typically, the hydroxy phenyl fatty acid is reacted with ammonia at temperatures between 90° and 250° C., e.g., 170° to 220° C. As an aside, I have observed that the higher temperatures (e.g., 280° C.), in conjunction with larger amounts of catalyst and longer reaction times, tends to favor formation of the corresponding hydroxy phenyl fatty nitriles. Pressure is not critical and can vary widely. Conveniently, ammonia gas is introduced into the reaction zone in the form of a gas sparge. Catalysts can be employed and reaction times can range from ½ to 20 hours, although times of from 3 to 12 hours, e.g., 6 hours are more common. The ammonolysis will ordinarily be conducted until the acid value has been reduced below 15 and more frequently until the acid value is below 10, e.g., below 5. It is particularly desirable that the acid value be reduced below 1.

These hydroxy phenyl fatty amides can then be reacted with varying amounts of formaldehyde to form condensation polymers. In preparing these polymers, the mole ratio of formaldehyde to hydroxy phenyl fatty amide can range from 0.05:1 to 4:1. More usually, the mole ratio of formaldehyde to hydroxy phenyl fatty amide will be from 0.1:1 to 2.5:1. A particularly preferred mole ratio of formaldehyde to hydroxy phenyl fatty amide is from 0.5:1 to 2:1, e.g., from about 1:1 to 1.5:1. This condensation reaction between formaldehyde and a hydroxy phenyl fatty amide is conducted in the presence of heat. Reaction temperatures will generally range from 60° to 300° C., and more usually from 85° to 250° C. The reaction is exothermic and consequently it is only necessary to heat the reactants to a reaction temperature. Then, the heat of reaction will sustain the reaction and elevate the temperature. Cooling of the system (e.g., by reflux or jacket cooling) is desirable. Reaction times can vary widely, e.g., ½ to 20 hours, although times of from 2 to 8 hours are more common. Pressure is not critical and can vary widely.

The use of a catalyst is preferred, since the condensation between formaldehyde and hydroxy phenyl fatty amides is generally slow in the absence of a catalyst. Acid catalysts which can be used are hydrochloric acid, sulfuric acid, formic acid, acetic acid, oxalic acid, tartaric acid, aromatic sulfonic acids and the like. Sulfuric acid is preferred. The rate of reaction tends to increase with increasing concentrations of the acid catalyst. Where polyhydroxy phenols have been used to form the hydroxy phenyl fatty amides, there is less of a need for a catalyst. Interestingly, when hydroxy phenyl fatty amides are condensed with formaldehyde using alkaline catalysts (e.g., KOH), the resulting products differ significantly from those produced using acidic catalysts.

When a liquid polymer or prepolymer has been prepared by the condensation of formaldehyde with a hydroxy phenyl fatty amide, a solid resin can be obtained by further reaction of the liquid prepolymer with an aldehyde (e.g., additional formaldehyde) or a ketone. Likewise, simply heating a liquid prepolymer to further react it, often results in producing a solid resin. Similarly, $SCl_2$ can be condensed with these condensation products to give a sulfur-bridged polymer. Alternatively, the condensation products can be reacted with $PCl_3$ or $POCl_3$ to form extremely high molecular weight phosphorus-containing polymers. In a further alternative, an epihalohydrin such as epichlorohydrin can be reacted with the condensation products to form the corresponding glycidyl ethers. Thus, it will be appreciated that both the hydroxy phenyl fatty amides and the condensation products (with formaldehyde) are useful as intermediates for preparing a wide variety of materials, having an even wider variety of uses.

The present invention will be further understood by reference to the following specific examples which include a preferred embodiment. Unless otherwise indicated, all parts and percentages are by weight.

EXAMPLES OF THE HYDROXY PHENYL ACIDS
(EXAMPLES 1–5)

Example 1

828 parts of commercial oleic acid (a mixture containing 90% unsaturated acid and 10% saturated fatty acid), 564 parts of phenol (mole ratio of phenol to fatty acid of about 2:1), 40 parts of a clay catalyst (Filtrol 78), and 50.8 parts of free water (3.43% of total reactant charge) were placed in a 316 stainless steel Parr reactor. The reactor was purged with nitrogen, sealed, and then heated to 460° to 490° F. at 200 to 220 p.s.i.g. for seven hours with agitation. The reaction mixture was then cooled and distilled to remove unreacted phenol. The reaction product was analyzed as phenol stearic acid (i.e., 9(10) (hydroxy phenyl) stearic acid). 98% of the unsaturated fatty acids present in commercial oleic acid were converted to addition products. Of this amount, about 3% was ester (unwanted) and about 95% was hydroxy phenyl stearic acid (including about 2% hydroxy phenyl stearic anhydride).

Example 2

700 parts of commercial oleic acid (90% ethylenically unsaturated acids), 649 parts of o-cresol, 42 parts of acidic clay catalyst (Filtrol 105), and 63.7 parts of free water (4.5 weight percent) were charged to a 316 stainless steel Parr reactor. The reactor was purged with nitrogen, sealed and then heated at 480° to 490° F. at 300 to 340 p.s.i.g. for six hours with agitation. The reaction mixture was then cooled and filtered to remove the catalyst. Then, excess cresol was removed by vacuum distillation. Routine analyses were performed including the determination of acid value, saponification value, hydroxyl value, infra-red analysis, and gas-liquid chromatography. Conversion was determined by several alternate methods and was found to be about 93 weight percent based on the unsaturated acids present in the commercial oleic acid. The product was 9(10) (cresol) stearic acid (the aromatic residue can add to either side of the double bond). The ester produced was 5.8 percent.

Example 3

497 parts of commercial oleic acid (90% unsaturated acids), 742 parts of 2,6-ditertiary butyl phenol, 43 parts of clay catalyst (Filtrol 78), and 50.42 parts of free water (3.8% based on the total reactant charge) were placed in a 316 stainless steel Parr reactor. The reactor was purged with nitrogen, sealed, and heated to 490° to 500° F. at a pressure of 460 to 495 p.s.i.g. for six and one-half hours. The reaction mixture was then cooled, filtered to remove the catalyst, and the excess 2,6-ditertiary butyl phenol was removed by vacuum distillation. Approximately 65% of the unsaturated acids were alkylated during the six and one-half hour reaction cycle. The product was 9(10)(2,6-ditertiary butyl phenyl) stearic acid.

Example 4

276 parts of commercial oleic acid (90% unsaturated acids), 330 parts of resorcinol, 20 parts of activated montmorillonite clay catalyst (Filtrol 78), and 25 parts of free water (3.9% based on total reactant charge) were placed in a 316 stainless steel Parr reactor. The reactor was purged with nitrogen, sealed, and heated at 460° to 500° F. under a pressure of 95 to 150 p.s.i.g. for nine hours with agitation. Product recovery was as described in Example 3. The product obtained was identified as the 9(10) resorcinol alkylate of oleic acid.

Example 5

425 parts of commercial ethylenically unsaturated dimer fatty acids (Empol 1014), 201 parts of commercial phenol (88% phenol and 12% water to give a water content of about 3.8 percent), and 24 parts of acidic montmorillonite clay catalyst (Filtrol 105) were placed in a 316 stainless steel Parr reactor. The reactor was purged with nitrogen, sealed, and heated to 435° to 500° F. under a pressure of from 190 to 270 p.s.i.g. for six and one-half hours. The reaction mixture was then cooled, filtered to remove the catalyst, and stripped under vacuum (a vacuum of 29" of mercury) to a temperature of 200° C. using a steam sparge. 87.5% of the dimer acids were converted into the monophenol substituted dimer acids. The reaction product contained no measurable amount of ester or anhydride.

EXAMPLES OF THE HYDROXY PHENYL FATTY AMIDES (EXAMPLES 6–7)

Example 6

A mixture of 250 parts of hydroxy phenyl stearic acid and 1 part of zinc acetate was sparged with ammonia gas under substantially atmospheric pressure. Sparging was commenced after first heating the mixture to 100° C. The resulting ammonolysis reaction was exothermic and the temperature rose to 205° C. after sparging for 2 hours and 45 minutes. After 8 hours, the acid value of the reaction mixture was 11. Sparging was continued for approximately 5 more hours to convert more of the starting material (i.e., the hydroxy phenyl fatty acid) to the corresponding amide. At the end of this time, the resulting product was a liquid having a solid point of minus 19° C. Infra-red analysis showed this material to be substantially all converted to the amide, with only a trace of acid present. This product was identified as 9(10) hydroxy phenyl) stearamide.

Example 7

Similar results are obtained by reacting the hydroxy phenyl fatty acids of Examples 1–5 with ammonia under ammonolysis conditions.

EXAMPLES OF THE CONDENSATION OF FORMALDEHYDE WITH HYDROXY PHENYL FATTY AMIDES (EXAMPLES 8–9)

Example 8

73.5 parts of hydroxy phenyl stearamide and 20.5 parts of a 37% aqueous solution of formaldehyde were intimately mixed with 2 parts of concentrated sulfuric acid (as a catalyst). The mole ratio of formaldehyde to hydroxy phenyl stearamide was about 1.25:1. This mixture was heated for about 4 hours at atmospheric pressure. During this time, the temperature rose from about 90° to 205° C. At this point, the reaction product was an extremely tough, viscous, prepolymer. Samples of this material were found to be strongly adherent to both metal and glass. This product was an effective adhesive. On continued heating, this rubbery, viscous material seemed to react further and, on cooling, was a hard brown resinous solid.

The solid resin had a brittle point of between minus 30° and minus 40° C. When tested by differential thermal analysis, the hard resin began to soften at 240° to 260° C., and seemed to melt rather sharply at 335° C. On continued heating, the solid resin was converted to a black, gooey, liquid. Infra-red analysis of the condensation product indicated the presence of secondary amide groups. Thermogravimetric analyses indicated that the resin was thermosetting.

Example 9

Similar results are obtained by reacting the hydroxy phenyl fatty amides of Example 7 with formaldehyde.

What is claimed is:
1. A compound selected from the group consisting of 9-hydroxy phenyl stearamide and 10-hydroxy phenyl stearamide.

References Cited

UNITED STATES PATENTS

| | | | |
|---|---|---|---|
| 3,074,983 | 1/1963 | Barrett et al. | 260—413 |
| 3,282,939 | 11/1966 | Spivack et tal. | 260—404 X |

FOREIGN PATENTS

| | | |
|---|---|---|
| 66,225 | 8/1950 | Netherlands. |
| 80,848 | 3/1956 | Netherlands. |

ALEX MAZEL, Primary Examiner

R. V. RUSH, Assistant Examiner

U.S. Cl. X.R.

260—32.6, 72